Aug. 26, 1924.
J. G. BOVEY
SIGNAL
Filed May 21, 1923
1,506,334
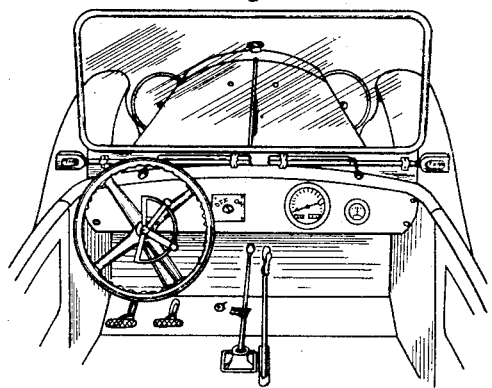
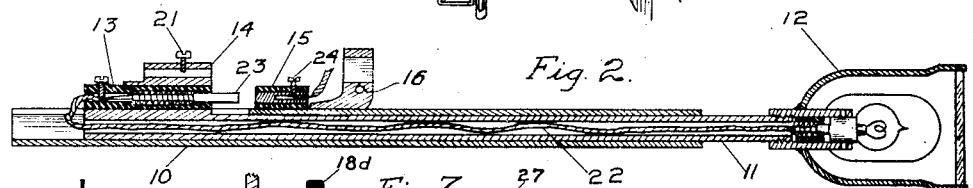
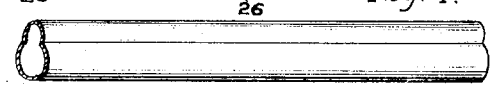
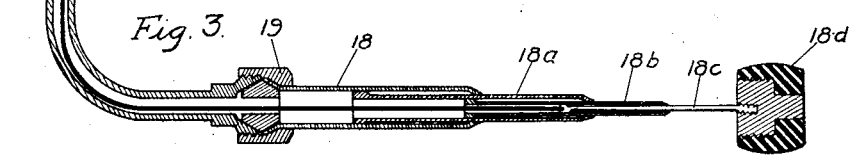
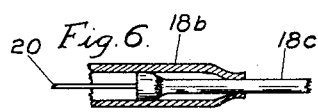
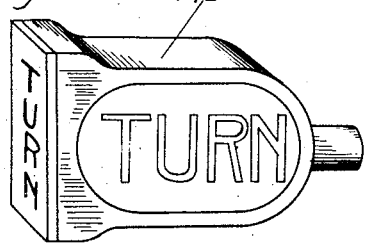
J. G. Bovey INVENTOR.
BY
Emil F. Lang ATTORNEY.

Patented Aug. 26, 1924.

1,506,334

UNITED STATES PATENT OFFICE.

JESSE G. BOVEY, OF LINCOLN, NEBRASKA.

SIGNAL.

Application filed May 21, 1923. Serial No. 640,459.

*To all whom it may concern:*

Be it known that I, JESSE G. BOVEY, a citizen of the United States, residing at Lincoln, in the county of Lancaster and State of Nebraska, have invented certain new and useful Improvements in Signals, of which the following is a specification.

My invention relates to the general class of devices known as indicators, and more especially to those devices which are employed on automobiles to indicate to other users of the road the intentions of the driver as regards direction of travel.

The most common method of indicating a turn to the right or left is for the driver or other occupant of the automobile to project the hand from the right or left side of the automobile. If the driver is alone in the car, this necessitates his using one of his hands for signalling purposes at the time when he most needs both of his hands on the steering wheel, the signalling being necessary only where the traffic is liable to be more or less conjested. In the event that side curtains are in place, or in cars of the closed type, this method of signaling becomes impracticable or impossible.

I am aware that numerous devices for mechanically signalling the driver's intentions have been placed on the market, but their inherent defects have kept them from general and even from extensive use. To be commercially successful, such a device must be simple in construction and capable of being constructed at low cost, it must be neat and dainty in appearance, it must be useful with all types of cars, it must be positive and reliable in action, and it should be as useful for night driving as it is in the daytime. The object of my invention is the provision of a signal having all of these advantages and others which will appear in the description.

Referring now to the drawings which are part of my application, and in which like reference numerals refer to like parts in the description, Figure 1 is a view of the front of the automobile as seen from the driver's seat, and showing my novel signal secured to the inner side of the dash board of the automobile.

Figure 2 is a sectional view showing the signal, the sliding signal arm, the support for the signal arm, and the illumination system.

Figure 3 is a sectional view of the actuating mechanism of my signal.

Figure 4 is a view in perspective of the casing which not only gives a neat, finished appearance to the signal, but also protects the electrical contacts.

Figure 5 is a perspective view of the signal element.

Figure 6 is a fragmentary view of a portion of the actuating arm shown in Figure 3.

Figure 7 is a view showing the manner in which my signal device may be secured to the outer side of the automobile with the actuating arms on the inside, and showing also the secondary signal system which I use in conjunction with that shown in Figures 1 to 6 inclusive.

Numeral 10 designates a tubular member which may be fixed in horizontal transverse position to the front of an automobile, on either the inner or the outer side. The means for attaching the tubular member 10 to the automobile depend very much on the type of car on which the installation is to be made, and the circumstances in each case must determine whether clamps, brackets, or other fastening means are most suitable.

Inside the tubular member is a sliding tube 11 having an external diameter which is substantially equal to the internal diameter of the tube 10. One end of the tube 11 projects beyond the outer extremity of the tube 10 and is externally screw threaded for securing thereto the signal 12. At its opposite or inner end the tube 11 carries on its upper side an insulating sleeve 13 and a securing device 15, the functions of these two devices to be explained in detail later in the description. The parts 13 and 14 project outside of the tube 10, and for this reason the tube 10 is slotted to provide a path for the parts 13 and 14 during the sliding movements of the tube 11. Secured to the tube 10 adjacent the inner extremity of the slot is an electrical contact member 15 and a securing clamp 16 for the actuating arm.

In Figure 3 I have shown the actuating arm which constitutes part of my signalling device. The tube 17 is bent so that its two parts are in perpendicular relation to each other with the intermediate portion rounded to a curve of rather large radius. In assembling the device on the automobile, the free end of the tube 17 is inserted into the socket of the clamp 16 and is there secured by any suitable means, as a set screw (not shown). The opposite end of the tube 17 is secured to the fixed element 18 of a telescoping arrangement, by means of connections including a threaded nut 19. Slidable into the member 18 are two telescoping members 18ᵃ and 18ᵇ, the latter of which carries the telescoping rod 18ᶜ having a knob 18ᵈ secured thereto at its outer extremity.

Secured to the rod 18ᶜ at its inner extremity is a flexible element 20. The flexible element 20 may be made out of any suitable material such as steel or brass, and I prefer to have rectangular in cross section, although other shapes will answer the purpose, and it should be long enough to protrude from the open end of the tube 17 when the telescoping sections are extended. In assembling the device, the free end of the tube 17 is clamped into the clamp 16, after which the free end of the flexible element 20 is secured in the securing device 14 by means of the set screw 21. It will be apparent that movement of the knob 18ᵈ will either push or pull on the flexible element 20 to retract or to project the signal arm 11 sliding in the tube 10.

As before stated, the signal arm 11 has secured thereto at its outer extremity the signal 12. This signal 12 is provided with a bulb socket of the usual type, and has windows of red glass on its front and back sides and on its outer end. Each of these windows has thereon the word Turn. The bulb socket carries the end of an insulated conducting wire 22, the opposite end of which is connected with a spring pressed contact 23 in the insulating sleeve 13. Another conductor (not shown) connects the illumination system of the car with the socket 15, where it may be secured by means of the set screw 24. Provision is made for closing the circuit through the frame of the signal parts and car. It follows that when the signal arm 11 is moved to signal position, the light circuit will be made through the contacts just described, and that movement of the arm 11 in the opposite direction will immediately break the circuit.

The sleeve or collar shown in Figure 4 is double, comprising a smaller part which is adapted to encase a portion of the tube 10 and a large part for covering and protecting the parts 14 and 16 and the electrical connections and contacts. The sleeve is freely slidable on the tube 10 and may be readily removed to give access to the mechanism of the signal device. When in place it serves not only to protect, but it also gives a neat and finished appearance to the device.

The signal device may be installed on either the inner or the outer side of the car, Figure 1 showing it on the inner side and Figure 7 on the outer side. In the latter case, an aperture is provided in the dash board, and the device is assembled with the part 18 passing through the aperture. In either case, the knob 18ᵈ is within convenient reach of the driver of the car.

While one of my signal devices may be used alone on a car, I contemplate generally using two, positioned in alignment, and with a secondary signal system between the inner ends. As shown in Figure 7, the box 25 is secured to the front side of the dash board. This box comprises two compartments, preferably upper and lower, each compartment having a window 26. One of the windows 26 is red while the other is green. Each box is provided with an electric light bulb and a push button for closing the light circuit. In a traffic jam on a street corner, the driver flashes his red light to inform others that he has the right of way. If however he does not have the right of way, he so informs others by flashing the green light. When he wishes to make a turn either to the right or left, he pulls the appropriate knob 18ᵈ to display the "turn" signal. After the turn has been made he pushes on the knob 18ᵈ to retract the signal to its nonsignal position.

Having thus described my invention in terms which will be readily understood by others skilled in the art to which it pertains, what I believe to be new and desire to secure by Letters Patent of the United States is:—

1. In an actuating device for vehicle signals, a support having an aperture therein, an L-shaped tubular member secured at one of its extremities in the aperture of said support, a plurality of tubular members of decreasing diameters telescoping into each other and into said L-shaped tubular member, a rigid rod slidable into the tubular member of least diameter, and a flexible rod secured at the inner extremity of said rigid rod and passing through all of said tubular members and projecting beyond said support.

2. In an actuating device for vehicle signals, a support having an aperture therein, an L-shaped tubular member secured at its inner extremity in the aperture of said support, a plurality of tubular members telescoping into said L-shaped tubular member at its outer extremity, and a flexible actuating rod within said tubular members, said actuating rod being rectangular in cross section and being secured to slide lengthwise in said L-shaped tubular member when said telescoping tubular members are moved.

3. In an actuating device for vehicle signals, a support having an aperture therein, an L-shaped tubular member secured at its inner extremity in the aperture of said support, a plurality of tubular members telescoping into said L-shaped tubular member at its outer extremity, a flexible actuating rod within said tubular members, said actuating rod being rectangular in cross section and being secured to slide lengthwise in said L-shaped tubular member when said telescoping members are extended or retracted, and a sheath covering the inner leg of said L-shaped tubular member and said support, said sheath being slidable into its operative position.

In testimony whereof I affix my signature.

JESSE G. BOVEY.